United States Patent
Lyles et al.

(10) Patent No.: US 12,351,093 B1
(45) Date of Patent: Jul. 8, 2025

(54) TRUCK BED UNLOADING APPARATUS

(71) Applicants: Cathy Lyles, Lineville, AL (US); Veronica O' Neal, Lineville, AL (US)

(72) Inventors: Cathy Lyles, Lineville, AL (US); Veronica O' Neal, Lineville, AL (US)

( * ) Notice: Subject to any disclaimer, the term of this patent is extended or adjusted under 35 U.S.C. 154(b) by 205 days.

(21) Appl. No.: 18/241,967

(22) Filed: Sep. 4, 2023

(51) Int. Cl.
*B60P 1/38* (2006.01)
*B60P 7/08* (2006.01)

(52) U.S. Cl.
CPC .............. *B60P 1/38* (2013.01); *B60P 7/0823* (2013.01)

(58) Field of Classification Search
None
See application file for complete search history.

(56) References Cited

U.S. PATENT DOCUMENTS

| | | | |
|---|---|---|---|
| 3,448,876 A * | 6/1969 | Mosman | B60P 3/22 414/520 |
| 5,380,058 A * | 1/1995 | Short | B63B 17/023 114/361 |
| 5,775,765 A * | 7/1998 | Kintz | B60J 7/085 160/23.1 |
| 5,961,263 A * | 10/1999 | Nunez | B60P 7/083 410/104 |
| 6,755,456 B2 * | 6/2004 | Addicott | B60J 7/11 296/100.06 |
| 6,883,849 B2 * | 4/2005 | Hebert | B60P 1/003 224/403 |
| 7,240,939 B2 * | 7/2007 | Vandekerkhof | B60P 3/40 296/26.1 |
| 7,347,474 B2 * | 3/2008 | Shagbazyan | B60J 7/026 293/118 |
| 8,998,547 B2 | 4/2015 | Ferriggi, Jr. | |
| 9,381,845 B2 | 7/2016 | Miers et al. | |
| 2013/0175820 A1 * | 7/2013 | Lepage | B62D 33/0273 296/26.08 |
| 2013/0256352 A1 * | 10/2013 | Barnett | B60R 9/058 29/525.02 |
| 2013/0343848 A1 * | 12/2013 | Wangen | B60P 1/38 414/528 |
| 2023/0416025 A1 * | 12/2023 | Wilson | B60P 1/38 |

* cited by examiner

*Primary Examiner* — Joseph A Dillon, Jr.
(74) *Attorney, Agent, or Firm* — Sanchelima & Associates, P.A.; Jesus Sanchelima; Christian Sanchelima

(57) ABSTRACT

A truck bed unloading apparatus including a band assembly, a roll assembly and an electronic assembly. The band assembly includes a belt. The roll assembly includes rollers and a frame. The electronic assembly includes a motor. The rollers are equidistantly attached to the frame. The rollers are telescopical to adjust a length thereof so the frame can be adjusted to a truck bed. The frame is installed in the truck bed. The belt encloses the rollers. The motor is actuated to rotate the rollers forcing the belt to slide to remove debris or any material from the truck bed.

11 Claims, 4 Drawing Sheets

TRUCK BED UNLOADING APPARATUS

BACKGROUND OF THE INVENTION

1. Field of the Invention

The present invention relates to a truck bed unloading apparatus and, more particularly, to a truck bed unloading apparatus that allows unloading a truck bed by means of an apparatus which is positioned therein.

2. Description of the Related Art

Several designs for truck unloading apparatus have been designed in the past. None of them, however, include manual and electronic means for actuating a band which slides to unload a truck bed.

Applicant believes that a related reference corresponds to U.S. Pat. No. 9,381,845 issued for a cargo loading and unloading apparatus with an elongated handle and a crossbar assembly which allows the user to slide the cargo stored in a truck bed. Applicant believes that another related reference corresponds to U.S. Pat. No. 8,998,547 issued for a cargo holding apparatus for the bed of a pickup truck which allows the cargo in the bed to be moved towards the tailgate for unloading. None of these references, however, teach of a truck bead unloading apparatus that is comprised of an elongated band assembly with a plurality of rod members where the rod members are installed in the bed of the truck and the band assembly is secured around the cargo which facilitates the unloading of the cargo by allowing the cargo to slide out of the back of the pickup truck.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a truck bed unloading apparatus that includes a band capable of sliding by means of hard poles which are adapted to rotate with a momentum produced by the truck forcing the band with debris to slide, expelling debris from the truck.

It is another object of this invention to provide a truck bed unloading apparatus that includes poles which are adjustable to sizes of the bed of the truck to permit adjusting the present invention in different sized truck beds.

It is still another object of the present invention to provide a truck bed unloading apparatus that includes electronic actuation or manual actuation.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
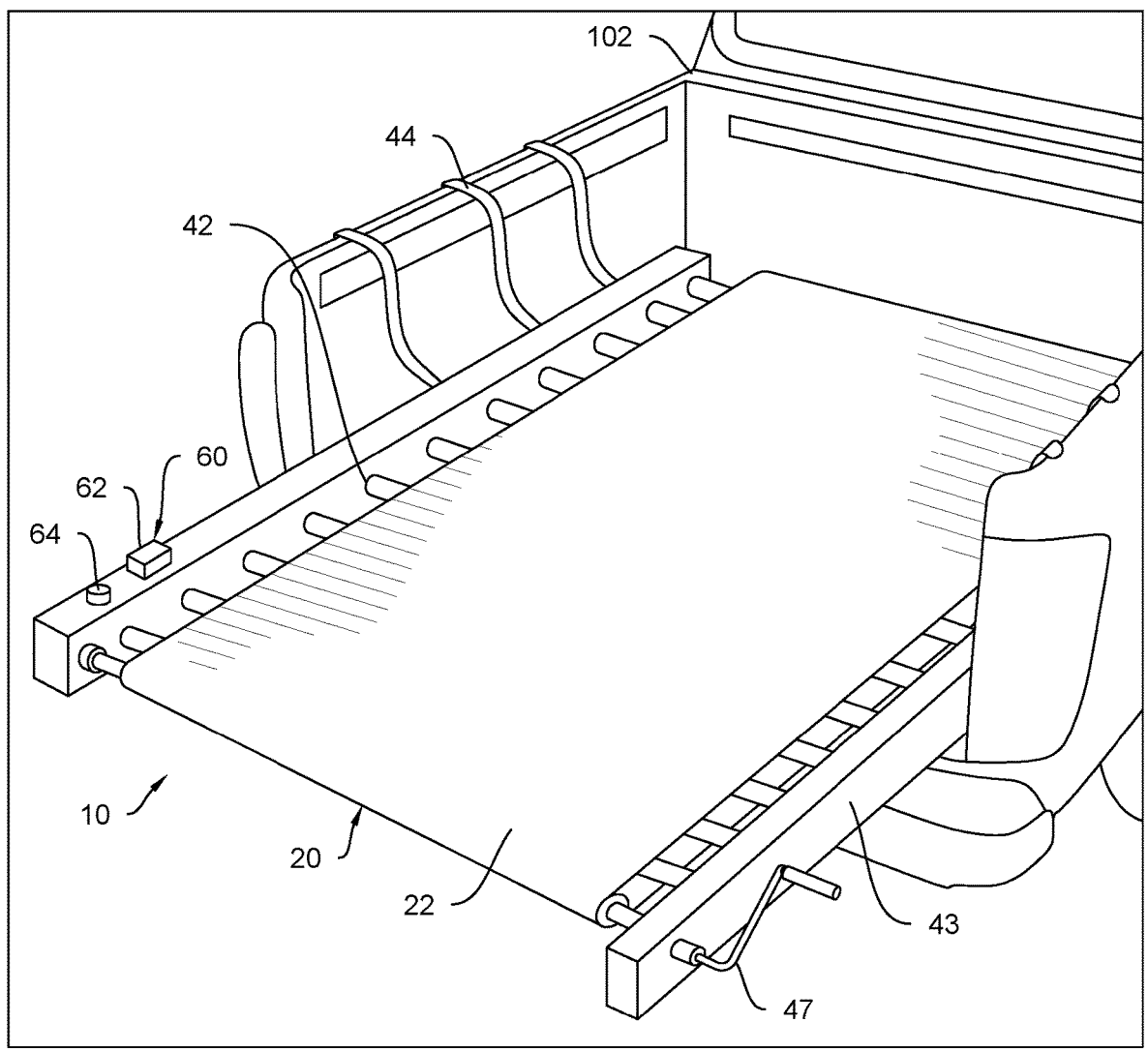
FIG. 1 represents an isometric operational view of the present invention 10. The present invention 10 is to be installed in bedtruck 102 to remove debris or any material therefrom.
Figure 2:
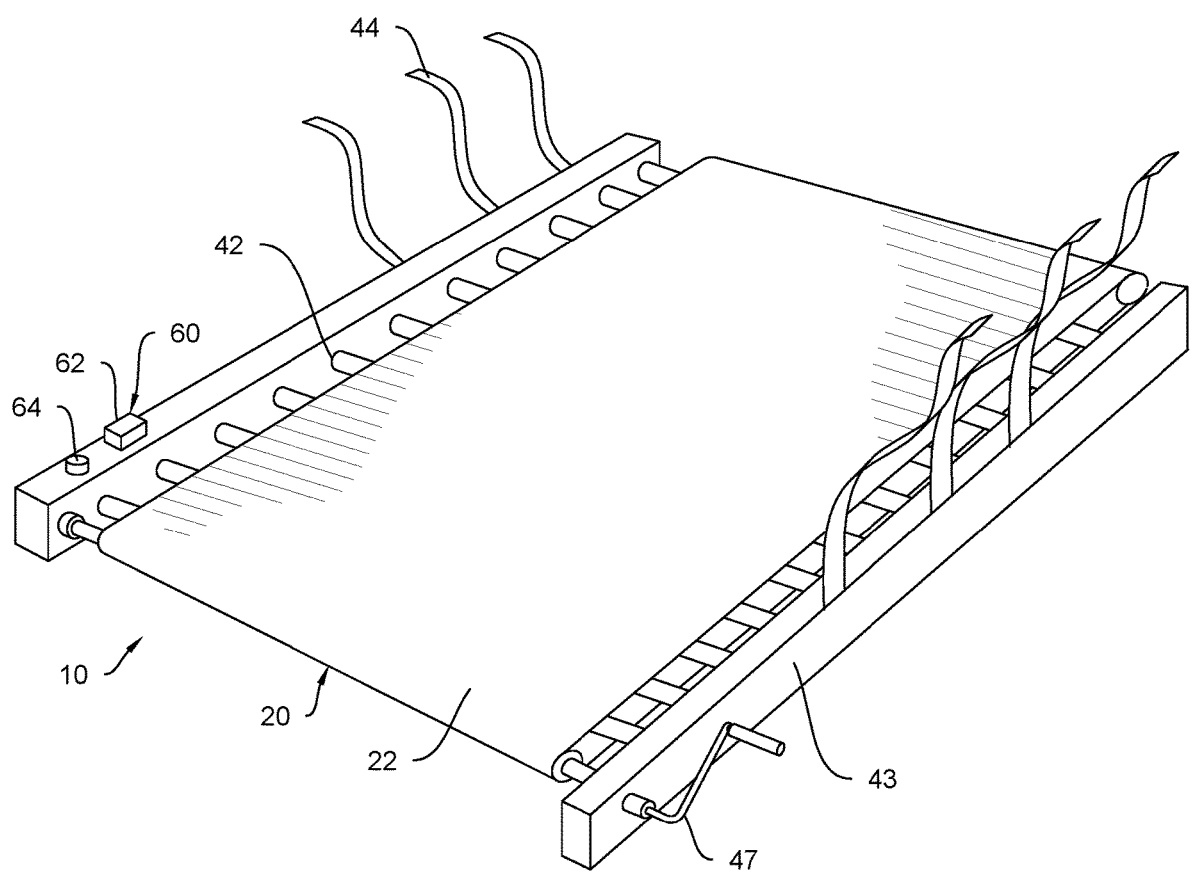
FIG. 2 shows an isometric view of the present invention 10. The present invention 10 includes a band assembly 20, a roll assembly 40 and an electronic assembly 60. The electronic assembly 60 is operated to slide the band assembly 20.
Figure 3:
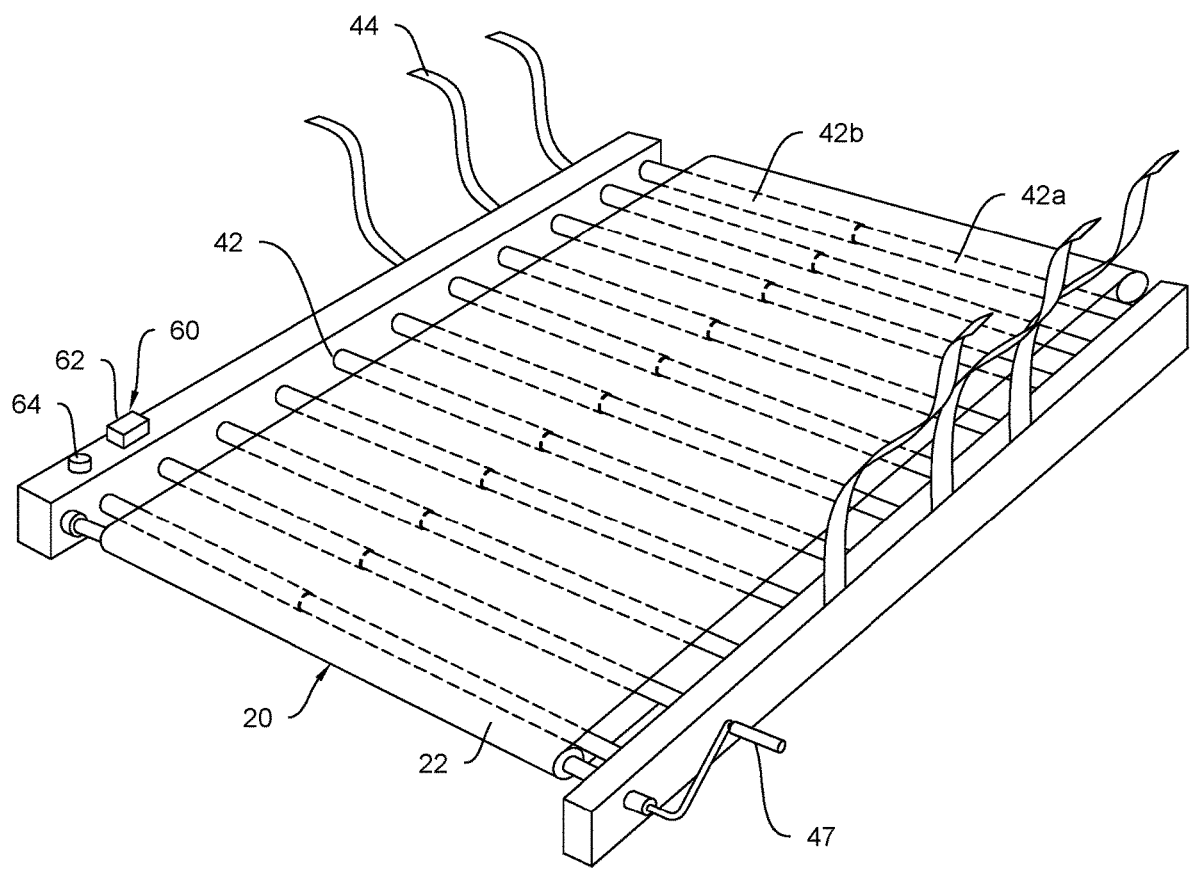
FIG. 3 illustrates a see through view of the present invention 10 showing the rolls 42 of the roll assembly 40.
Figure 4:
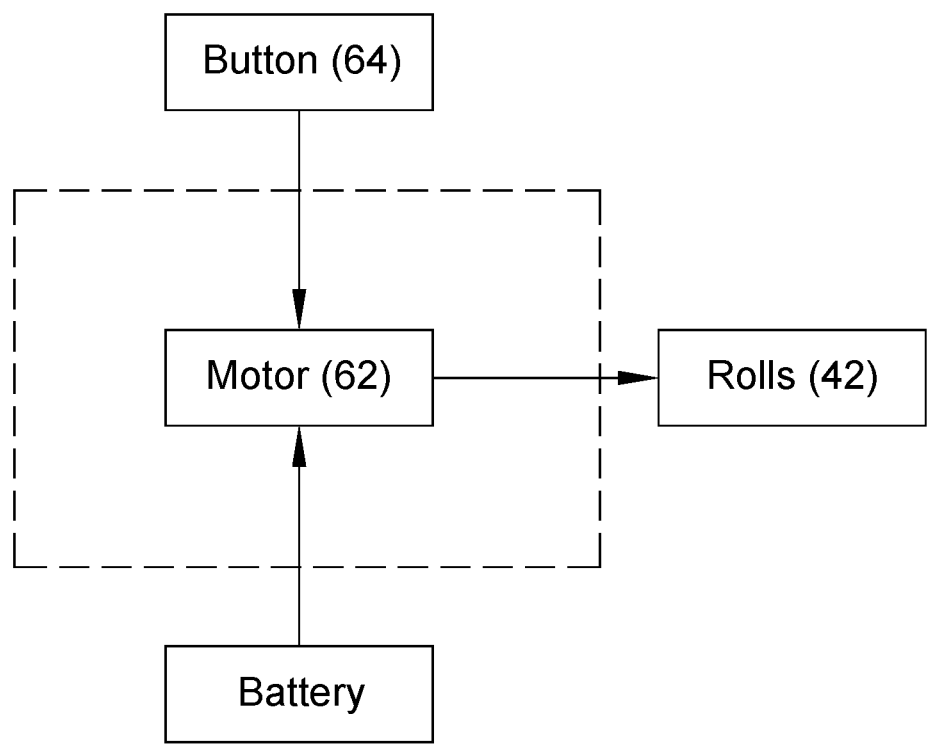
FIG. 4 depicts a schematic view of the electronic assembly 60.

Referring now to the drawings, where the present invention is generally referred to with numeral 10, it can be observed that it basically includes a band assembly 20, a roll assembly 40 and an electronic assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The band assembly 20 may include a belt 22. The belt 22 may have a rectangular shape closing in a loop. The belt 22 may be made of a rubber plastic. The belt 22 may be made of rubber plastic. It also may be suitable for the belt 22 to be made of aluminum, polyurethane, or any other suitable material. Band assembly 20 may be mounted in the roll assembly 40.

The roll assembly 40 may include rollers 42, a frame 43, holders 44, and a lever 47. Rollers 42 may have a cylindrical elongated shape. Rollers 42 may be telescopical. Rollers 42 may include a first cylindrical member 42a and a second cylindrical member 42b telescopically connected. The rollers 42 may be made of steel, iron, glassfiber, or any other resistant material. The rollers 42 may be rotatably connected within the frame 43. The rollers 43 may be equidistantly spaced.

The frame 43 may preferably include two rectangular members framing the rollers 42. Frame 43 may be made of aluminum, plastic fiber, or any other suitable material. Frame 43 may be equidistantly spaced. It also may be suitable for the frame 43 to have a cylindrical shape, a triangular shape, or any other suitable shape. The rollers 42 may be perpendicularly attached to the two rectangular members of the frame 43. In some embodiments the frame may include a rectangular frame, a triangular frame or a circular frame. The rollers 42 may vary in length. The frame 43 may cooperate with the rollers 42 to vary in length the present invention 10. Rollers 42 may be rotated by the electronic assembly 60 or by the lever 47. Lever 47 may be operatively connected to the rollers 42. Lever 47 may be disposed about a side of the lever 47. Lever 47 may be manually rotated to rotate the rollers 42. The belt 22 may be forced to slide rotating about the rollers 42 when rollers 42 rotate.

The holders 44 may extend from the frame 43. In some embodiments the holders 44 are ropes made of cotton, polyurethane, or any other suitable material. It also may be suitable for the holders 44 to be screws, metal hooks, or any other holder known in the art. The holders 44 may be used to fix the present invention 10 to the bed truck 102.

The electronic assembly 60 may include a motor 62 and a button 64. The motor 62 may be electronically connected to the rollers 42. The button 64 may be disposed about a top side of the frame. The button 64 may be depressed to actuate the motor 62. The motor 62 may force each of the rollers 42 to rotate forcing the belt 22 to slide. In some embodiments the motor is powered by means of a car battery or through a power cord. In a preferred embodiment the present invention 10 is placed in the truck bed 102 and adjusted through the telescopical rollers 42 to fit in the truck bed 10. Debris or any material may be placed over the belt 22. The levers 47 and the motor 62 may be actuated to rotate the rollers to slide the belt to remove the materials placed over the belt 22. It also may be suitable for the rollers 42 to rotate by back and forth movement of the truck.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A truck bed unloading apparatus, comprising:
   a band assembly, wherein said band assembly includes a belt;
   a roll assembly, wherein said roll assembly includes rollers and a frame, said rollers are equidistantly attached to said frame, said rollers are telescopical to adjust said rollers in length, said frame is installed in a truck bed, wherein said belt encloses said rollers; and
   an electronic assembly, wherein said electronic assembly includes a motor, said motor is actuated to rotate said rollers forcing said belt to slide.

2. The truck bed unloading apparatus set forth in claim 1, wherein said belt has a rectangular shape defining a closed loop.

3. The truck bed unloading apparatus set forth in claim 1, wherein said belt is made of plastic rubber.

4. The truck bed unloading apparatus set forth in claim 1, wherein each of said rollers include a first member and a second member telescopically connected.

5. The truck bed unloading apparatus set forth in claim 1, wherein said frame is formed by two parallel rectangular members separated by a predetermined distance.

6. The truck bed unloading apparatus set forth in claim 1, wherein said roll assembly includes a lever, said lever is operatively connected to said rollers wherein said lever is operated to rotate said rollers.

7. The truck bed unloading apparatus set forth in claim 1, wherein said frame includes a button, said button is operated to actuate said motor.

8. The truck bed unloading apparatus set forth in claim 1, wherein said frame includes holders, said holders are configured to fix said frame to said truck bed.

9. The truck bed unloading apparatus set forth in claim 8, wherein said holders are straps.

10. A truck bed unloading apparatus, comprising:
    a band assembly, wherein said band assembly includes a belt;
    a roll assembly, wherein said roll assembly includes rollers, a lever and a frame, said rollers are equidistantly attached to said frame, said rollers are telescopical to adjust said rollers in length, wherein each of said rollers include a first member and a second member telescopically connected, said frame is installed in a truck bed, wherein said belt encloses said rollers, said frame is defined by a first rectangular member and a second rectangular member, wherein said first rectangular member and said rectangular member are parallel to each other separated a predetermined distance, wherein said lever is operated to rotate said rollers; and
    an electronic assembly, wherein said electronic assembly includes a motor, said motor is actuated to rotate said rollers forcing said belt to slide.

11. A truck bed unloading apparatus, consisting of:
    a band assembly, wherein said band assembly includes a belt, wherein said belt has a rectangular shape defining a closed loop, wherein said belt is made of plastic rubber;
    a roll assembly, wherein said roll assembly includes rollers, a lever and a frame, said rollers are equidistantly attached to said frame, said rollers are telescopical to adjust said rollers in length, wherein each of said rollers include a first member and a second member telescopically connected, said frame is installed in a truck bed, wherein said belt encloses said rollers, said frame is defined by a first rectangular member and a second rectangular member, wherein said first rectangular member and said rectangular member are parallel to each other separated a predetermined distance, wherein said lever is operated to rotate said rollers, said frame further includes holders extending therefrom, said holders are configured to fix said frame to said truck bed; and
    an electronic assembly, wherein said electronic assembly includes a motor, said motor is actuated to rotate said rollers forcing said belt to slide, wherein said frame includes a button, said button is operated to actuate said motor.

* * * * *